(12) United States Patent
Barber et al.

(10) Patent No.: US 12,504,182 B2
(45) Date of Patent: Dec. 23, 2025

(54) PLAYGROUND AIR COOLER

(71) Applicant: Independence Design Group, Thurmont, MD (US)

(72) Inventors: Jeffrey Barber, Thurmont, MD (US); John B Hobson, Newark, OH (US)

( * ) Notice: Subject to any disclaimer, the term of this patent is extended or adjusted under 35 U.S.C. 154(b) by 297 days.

(21) Appl. No.: 18/207,994

(22) Filed: Jun. 9, 2023

(65) Prior Publication Data
US 2024/0019137 A1 Jan. 18, 2024

Related U.S. Application Data

(60) Provisional application No. 63/389,493, filed on Jul. 15, 2022.

(51) Int. Cl.
*F24F 5/00* (2006.01)
*F24F 7/06* (2006.01)
*F24F 13/08* (2006.01)

(52) U.S. Cl.
CPC .............. *F24F 5/005* (2013.01); *F24F 7/065* (2013.01); *F24F 13/08* (2013.01)

(58) Field of Classification Search
CPC .. F24F 5/005; F24F 7/065; F24F 13/08; F24F 13/20
USPC ........................................................... 165/45
See application file for complete search history.

(56) References Cited

U.S. PATENT DOCUMENTS

| 6,129,141 A | 10/2000 | Yang | |
|---|---|---|---|
| 2010/0226749 A1* | 9/2010 | Gammack | F24F 13/32 415/90 |
| 2017/0045246 A1* | 2/2017 | Kaleta | F24F 7/007 |

OTHER PUBLICATIONS https://www.walmart.com/ip/Mission-Instant-Cooling-Fan-Personal-Air-Cooler/341451562, Jun. 8, 2022.
https://oddifymall.com/earth-cooler-an-underground-beer-cooler, Jun. 8, 2022.

* cited by examiner

*Primary Examiner* — Steve S Tanenbaum
(74) *Attorney, Agent, or Firm* — Lippes Mathias LLP

(57) ABSTRACT

Disclosed herein is an air cooler including a housing having an upper portion and a lower portion. The upper portion of the housing includes an air intake, an air output, and a manually operated fan. The lower portion of the housing includes an air passage leading from the air intake to the air output. The air passage may include baffles that cause air to travel laterally. The air cooler is particularly designed for use on a playground.

20 Claims, 21 Drawing Sheets

PLAYGROUND AIR COOLER

CROSS-REFERENCE TO RELATED APPLICATIONS

This application claims priority to U.S. Provisional Patent Application Ser. No. 63/389,493, filed on Jul. 15, 2022, which is incorporated by reference in its entirety.

BACKGROUND

The present disclosure relates to devices and methods for a fan for cooling air with manual power. It is particularly contemplated that such air cooler devices and methods are used as playground equipment.

Most American schools and parks possess some sort of playground. Children often get very hot and sweaty while playing at a playground. Providing a way for children to cool down can increase they enjoyment and allow them to play for greater periods of time.

BRIEF DESCRIPTION

Disclosed herein are manually powered air coolers and methods for using said air coolers. The air cooler takes advantage of geothermal technology to produce cooler air, and is intended to be a fun and interactive device for users of all ages.

Disclosed in various embodiments are air coolers including a housing having an upper portion and a lower portion. The upper portion of the housing includes an air intake, an air output, and a manually operated fan. The lower portion of the housing includes an air passage leading from the air intake to the air output. The air passage is shaped to cause the air to travel laterally and vertically. In some particular embodiments, the air passage includes baffles that cause air to travel laterally.

Disclosed in other embodiments are methods which utilize the air cooler as described herein. The methods generally include turning a hand crank to operate the fan.

In other particular embodiments, the air cooler includes a housing having a main body and a footer. The main body contains an air intake, an air output, and a manually operated fan. The footer contains an air passage leading from the air intake to the air output. The air passage is shaped to cause the air to travel laterally and vertically, for example by the inclusion of baffles that cause air to travel laterally. The footer is adapted to be buried underground to improve stability.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
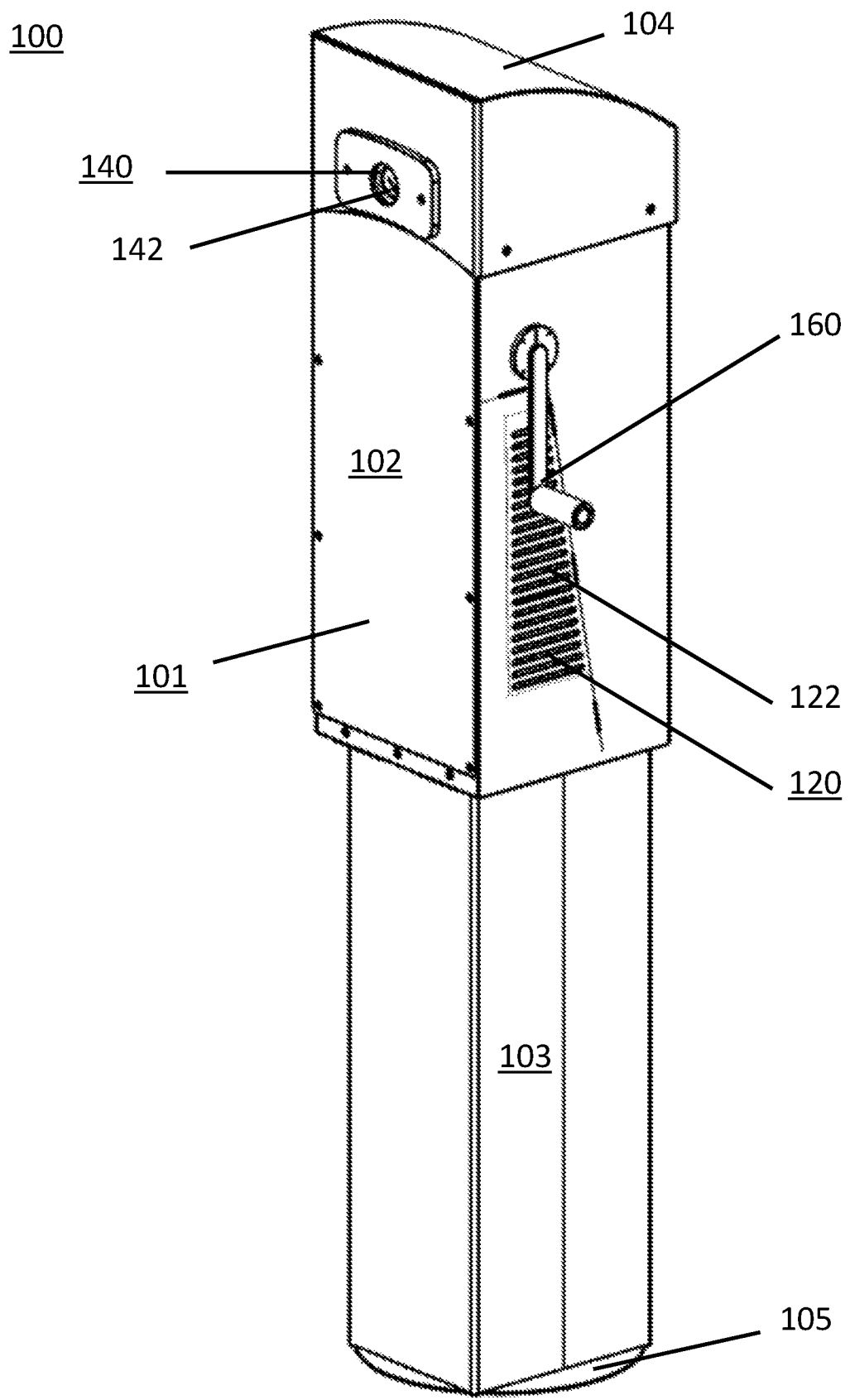
FIG. 1 is an exterior front perspective view of one embodiment of an air cooler of the present disclosure.

A more complete understanding of the components and devices disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

The term "comprising" is used herein as requiring the presence of the named components/steps and allowing the presence of other components/steps. The term "comprising" should be construed to include the term "consisting of", which allows the presence of only the named components/steps.

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

A value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number.

The terms "top" or "upper" and "bottom" or "lower" are used to refer to locations/surfaces where the top/upper is always higher than the bottom/lower relative to an absolute reference, i.e. the surface of the earth. The terms "upwards" and "downwards" are also relative to an absolute reference; upwards is always against the gravity of the earth.

The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other.

The present disclosure relates to air coolers which use manual power to provide a cool breeze. One application for these air coolers is as playground equipment, though other applications are contemplated as well. In this regard, the air cooler includes an upper portion and a lower portion. The lower portion is intended to be buried underground, and use the ground as a heat sink to cool the air.

Figure 2:
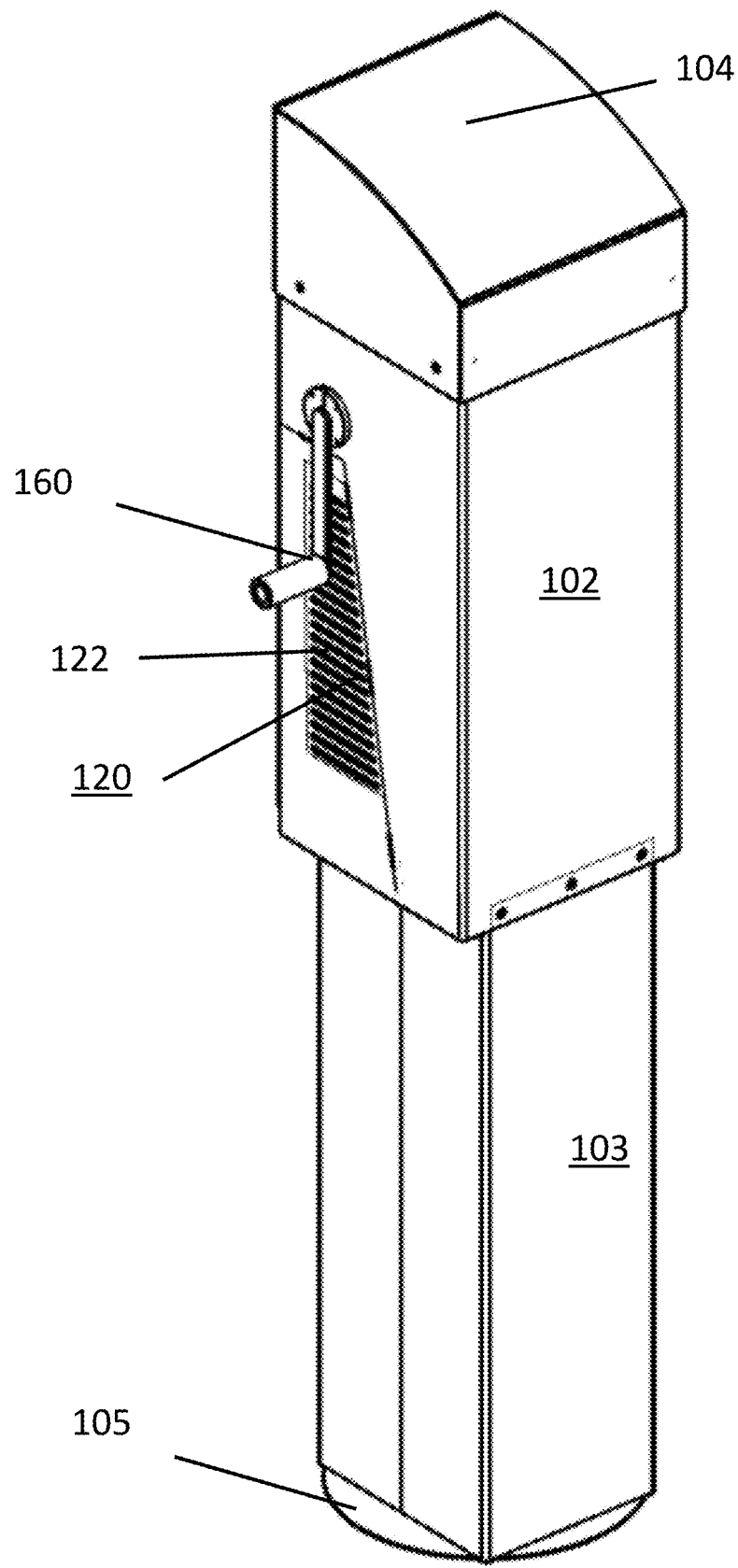
FIG. 2 is an exterior rear perspective view of the air cooler of FIG. 1.
Figure 3:
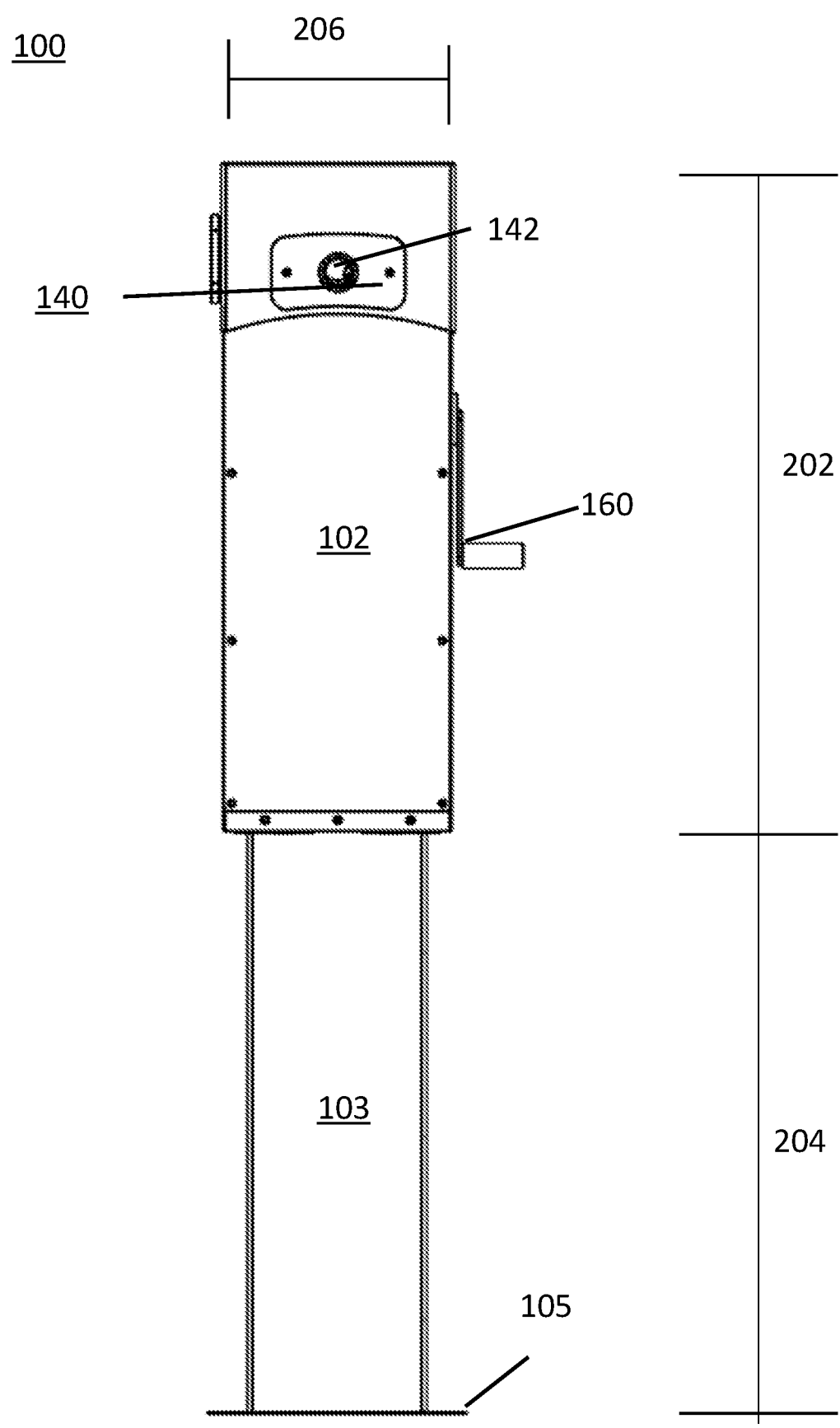
FIG. 3 is a front view of the air cooler of FIG. 1.
Figure 4:
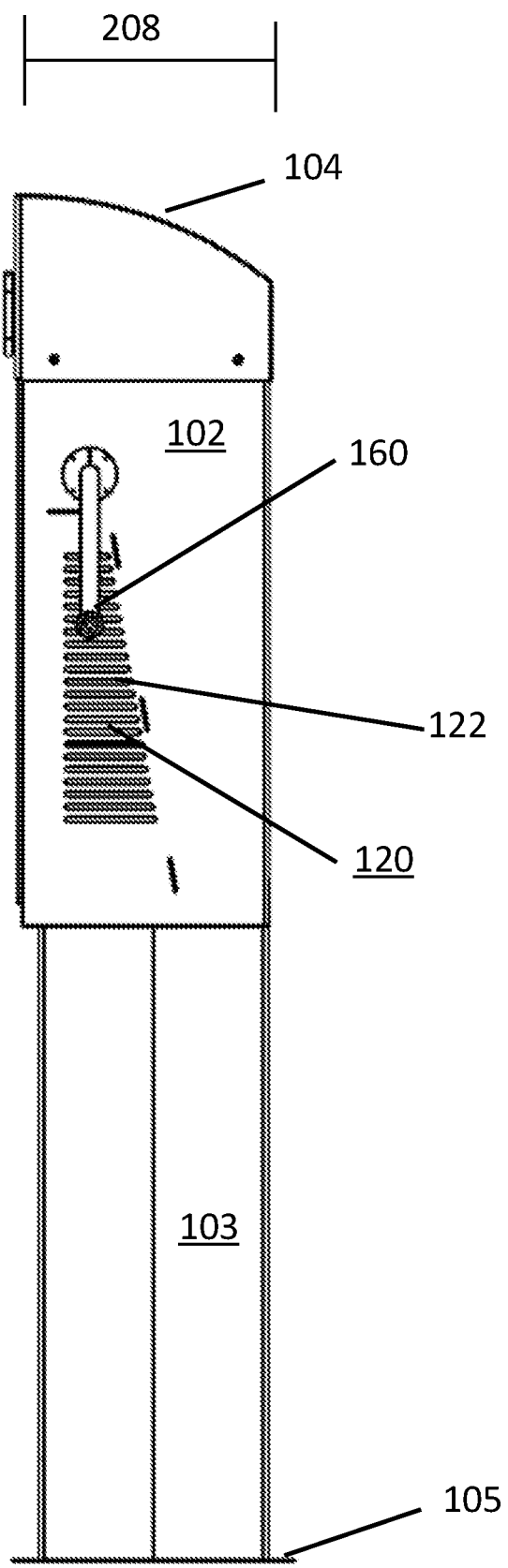
FIG. 4 is a right side view of the air cooler of FIG. 1.
Figure 5:
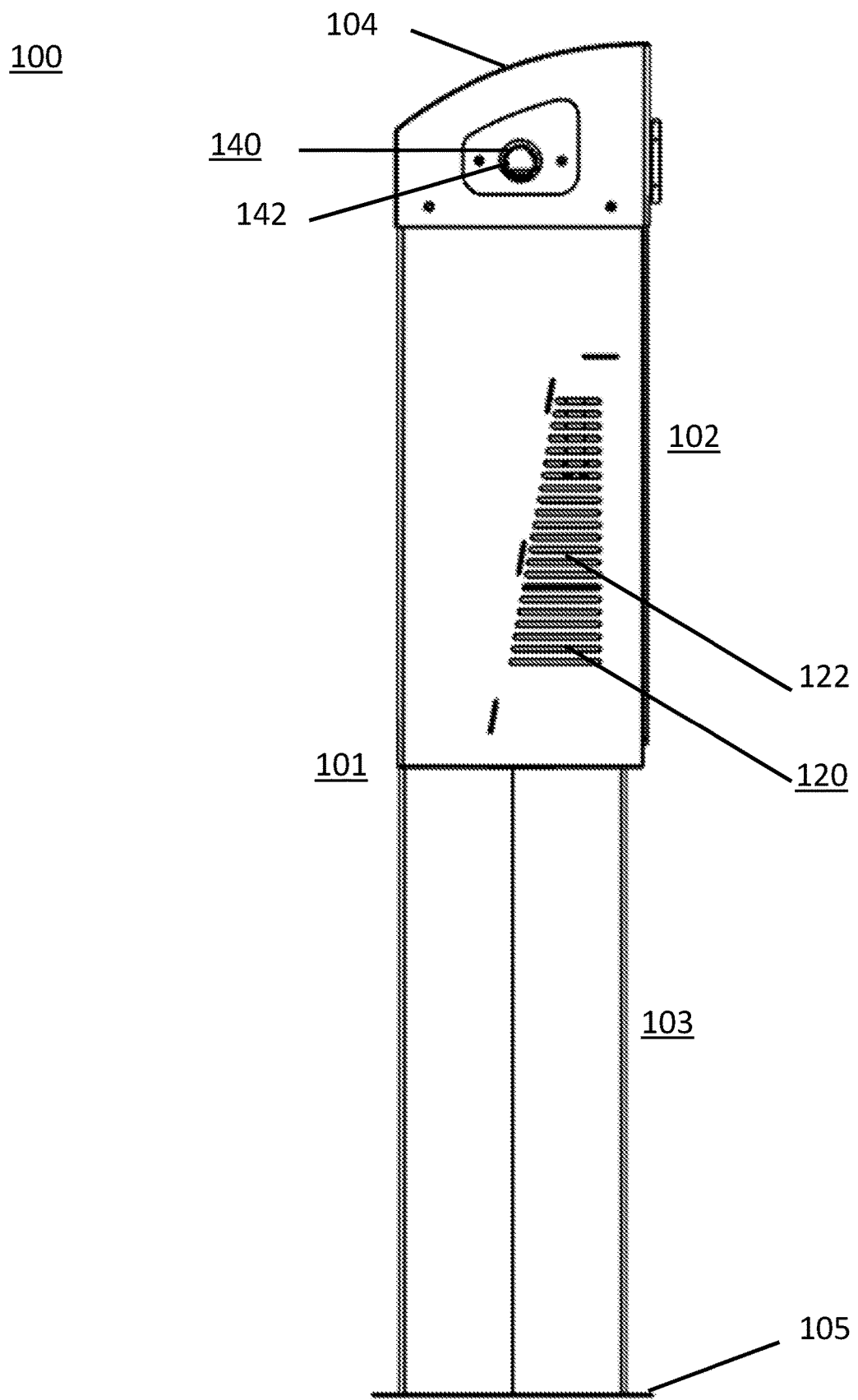
FIG. 5 is a left side view of the air cooler of FIG. 1.
Figure 6:
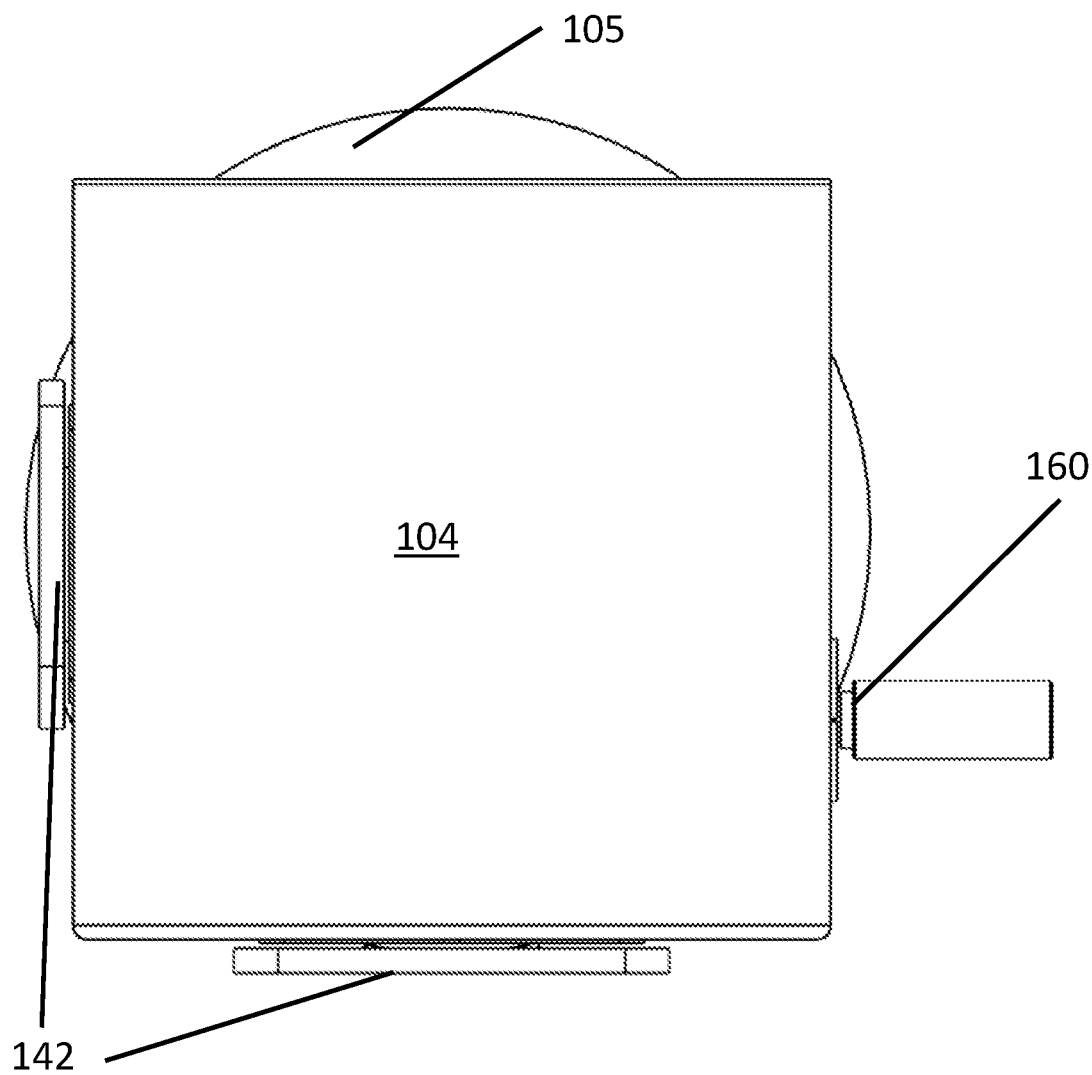
FIG. 6 is a top view of the air cooler of FIG. 1.

FIGS. 1-6 are drawings of the exterior of a first embodiment of an air cooler 100 in accordance with some embodiments of the present disclosure. FIG. 1 is an exterior front perspective view. FIG. 2 is an exterior rear perspective view. FIG. 3 is a front view. FIG. 4 is a first or right side view. FIG. 5 is a second or left side view. FIG. 6 is a top or plan view.

Referring to all six figures together, the air cooler includes a housing 101 which is divided into an upper portion 102 and a lower portion 103. The upper portion may also be referred to as a main body or surface unit, and the lower portion may also be referred to as a footer.

The upper portion includes an air intake 120, which may be made up of one or a plurality of inlet slots 122 located on different sides of the upper portion of the housing. As illustrated in FIGS. 1-6, one inlet slot 122 is present on a first or right side 106 of the housing, and one inlet slot 122 is present on a second or left side 107 of the housing. These inlet slots collectively make up the air intake 120. Not shown are bug shields over the inlet slots.

The upper portion also includes an air output 140, which may be made up of one or a plurality of outlet vents 142 located on different sides of the upper portion of the housing. As best seen in FIG. 1 and FIG. 5, one outlet vent 142 is present on the front side 108 of the housing, and one outlet vent 142 is present on the second or left side 107 of the housing. These outlet vents collectively make up the air output 140. Not shown are bug shields over the outlet vents. In this embodiment, the air output 140 is located above the air intake 120.

Continuing, the lower portion 103 of the housing includes a base 105. As illustrated in FIGS. 1-6, the base 105 has a circular shape while the lower portion of the housing has a rectangular shape. The base may extend past the sides of the lower portion of the housing. As previously mentioned, the lower portion is intended to be buried underground, and the larger base may serve to stabilize the housing and fix the housing in the ground. As also seen in FIG. 6, the base 105 may extend beyond the sides of the top wall 104. It is noted the base may be made as a separate component from the rectangular lower portion of the housing, or may be an integral piece of the lower portion.

Next, the top wall 104 of the upper portion of the housing has a curved exterior surface. As illustrated here, the curve runs downwards from the front side 108 of the housing towards the rear side 109 of the housing. The curved exterior surface prevents accumulation of standing water upon the air cooler. Finally, a hand crank 160 is visible on the first or right side 106 of the air cooler.

In the embodiment of FIGS. 1-6, the hand crank 160 for powering the manually-operated fan is present on the first side 106 of the upper portion of the housing. The air intake comprises inlet slots 122 located on the first side 106 and the second side 107 of the upper portion of the housing. The air output comprises outlet vents 122 located on the front side 108 and the second side 107 of the upper portion of the housing. The front side of the housing can include an informational graphics panel that provides an educational aspect to the air cooler.

Referring to FIG. 3 and FIG. 4, the height of the upper portion 102 is indicated with reference numeral 202. The height of the upper portion may range, in various embodiments, from about 36 inches to about 60 inches. The height of the lower portion 102 is indicated with reference numeral 204. The height of the lower portion may range, in various embodiments, from about 36 inches to about 60 inches. The lower portion is intended to extend below the frost line. The height of the lower portion may be less than the height of the upper portion. The width of the housing is indicated with reference numeral 206. The width of the housing may range, in various embodiments, from about inches to about 24 inches. The length of the housing is indicated with reference numeral 208. The length of the housing may range, in various embodiments, from about inches to about 24 inches.

Figure 7:
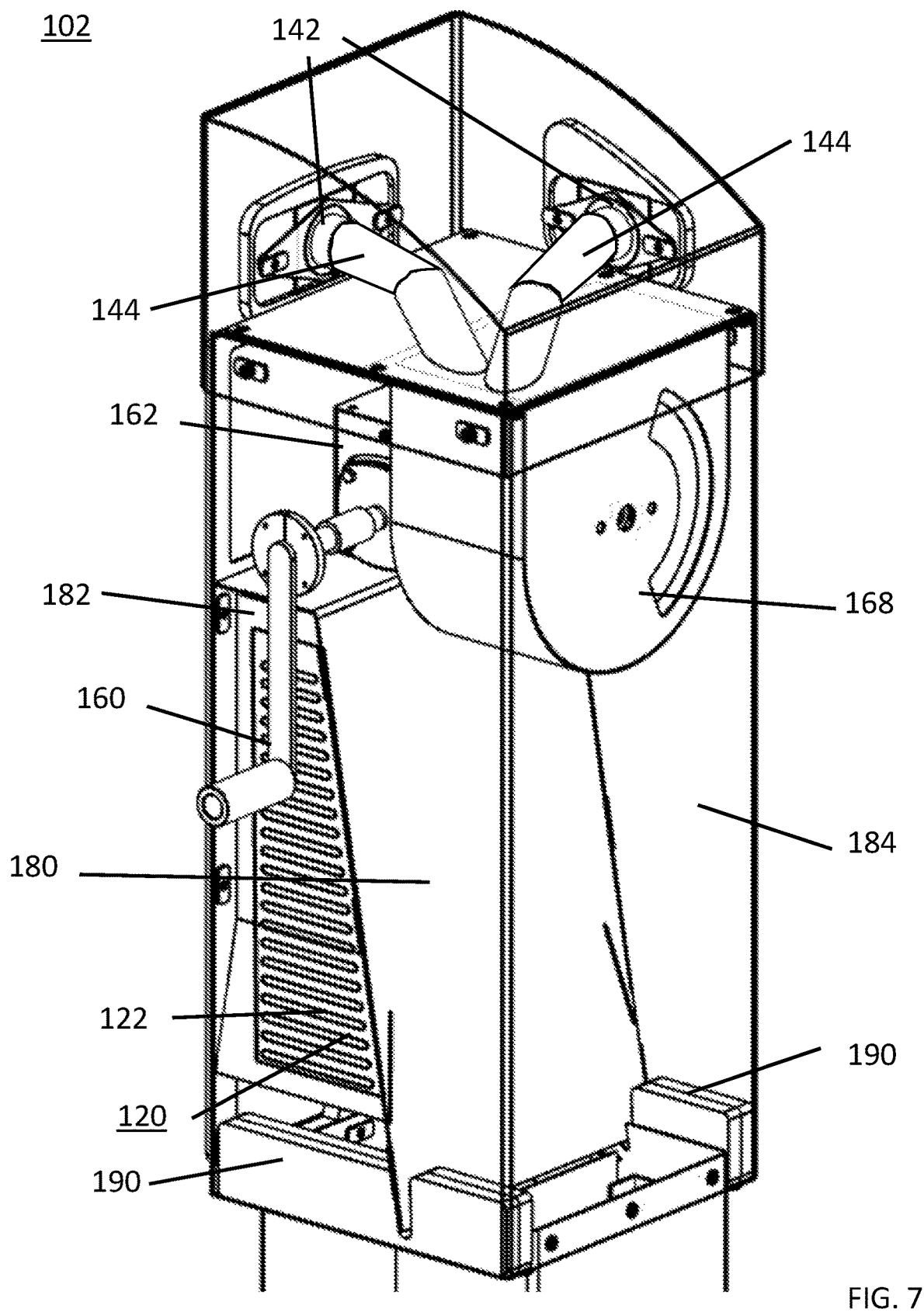
FIG. 7 is an interior rear perspective view of the upper portion of the air cooler of FIG. 1, through the housing.

FIG. 7 is a rear perspective view of the interior of the upper portion 102, through the housing. A divider 180 separates the upper portion of the housing into a front portion 182 and a rear portion 184. The air intake 120 feeds into the front portion, which subsequently directs air downwards and into an air passage, as will be explained further herein.

Continuing, the rear portion 184 also includes a manually operated fan 168 which is powered by the hand crank. The hand crank 160 is connected to a gearbox 162 containing a gear train, which then connects to the fan 168. The gearbox is sealed to avoid maintenance and downtime. The hand crank 160 is located above the divider 180. The output of the fan is shown here as passing through two hoses 144 to the outlet vents 142 located beneath the top wall 104. Not visible are rain dampers which are also included within the housing to reduce or prevent the housing from filling with water. However, the air cooler can handle small amounts of moisture and will dry out during use.

Figure 8:
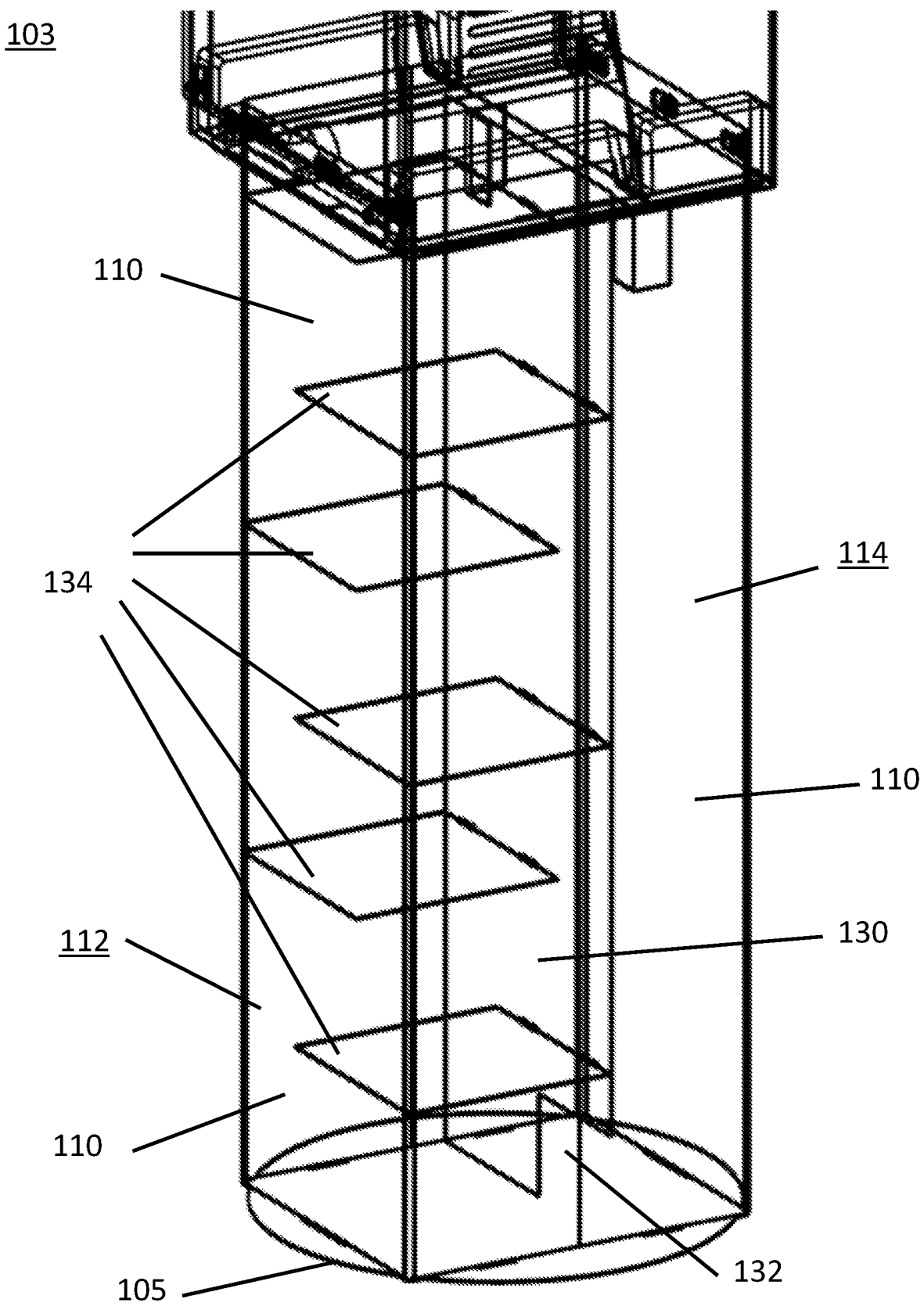
FIG. 8 is an interior front perspective view of the lower portion of the air cooler of FIG. 1, through the housing.

FIG. 8 is a front perspective view of the interior of the lower portion 103. The lower portion contains an air passage 110, which leads from the air intake 102 to the air output 103. As previously mentioned, the front portion 182 of the upper portion 102 directs air into the lower portion 103. The air passage 110 can be thought of as the empty space in the lower portion of the housing 103. In this embodiment, an insert 130 divides the air passage into a front portion 112 and a rear portion 114. The insert may include a cutout 132 at its bottom to permit the air to flow from the front portion of the air passage to the rear portion of the air passage. Baffles 134 are attached to the insert 130. These baffles cause air traveling through the air passage to travel laterally (i.e.

side-to-side). As illustrated here, the baffles 134 are in only the front portion 112 of the air passage.

The lower portion of the housing is intended to be buried underground. A hole can simply be drilled or dug, the housing is placed within the resulting hole, and the hole then backfilled with soil. There is no need to use concrete. It is noted that the entire lower portion does not have to be buried underground, and some part of the lower portion may remain above the ground.

Figure 9:
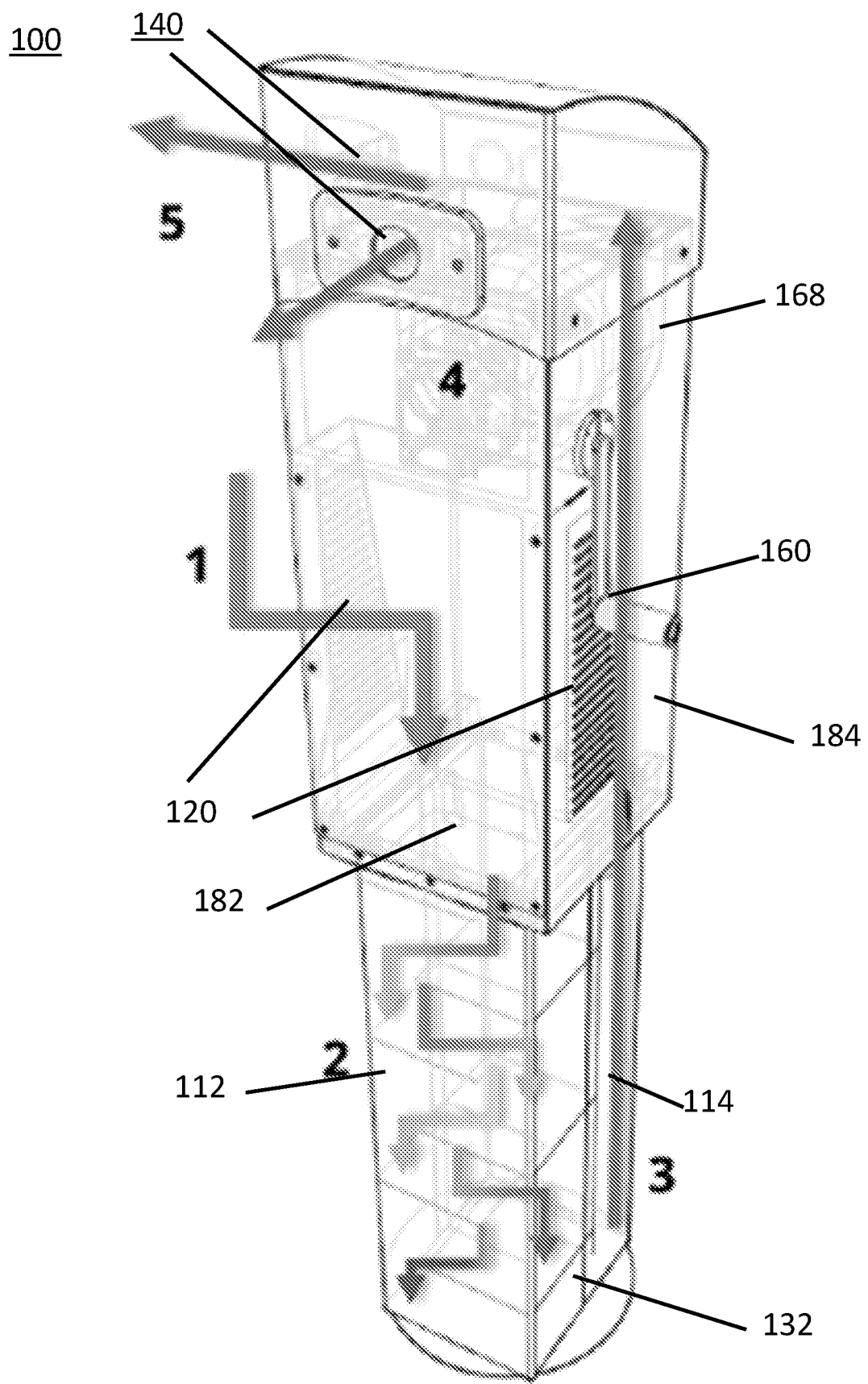
FIG. 9 is a front perspective view of the air cooler of FIG. 1, showing the direction of airflow through the air cooler.

The operation of the air cooler is shown in FIG. 9, which is a front perspective view showing the direction of airflow. When the user turns the hand crank 160, the manual rotation actuates the manually operated fan 168. The manually operated fan moves air through the air cooler 100. Air is pulled through the air intake 120 and into the front portion 182 of the upper portion of the housing. Air then moves downwards through the front portion 112 of the air passage. The baffles cause the air to move laterally as it travels downward through the lower portion 103. This increases the residence time of the air within the lower portion. As previously mentioned, the lower portion is buried underground. The surrounding earth is cooler than the air traveling through the air passage, and thus acts as a heat sink to cool the air.

At the bottom of the front portion of the air passage, air moves through the cutout 132 in the insert 130 to the rear portion of the air passage 114. Air is then drawn upwards through the rear portion 114 of the air passage and into the rear portion 184 of the upper portion of the housing. The air is then pulled through the manually operated fan 168, through the hoses, and out the air output 140 as a relatively cooler stream of air. The air stream exits the air output at a higher velocity, e.g. 8 to 15 miles per hour (mph), than the air stream entering the air cooler, increasing the sensation of cooling.

Figure 10:
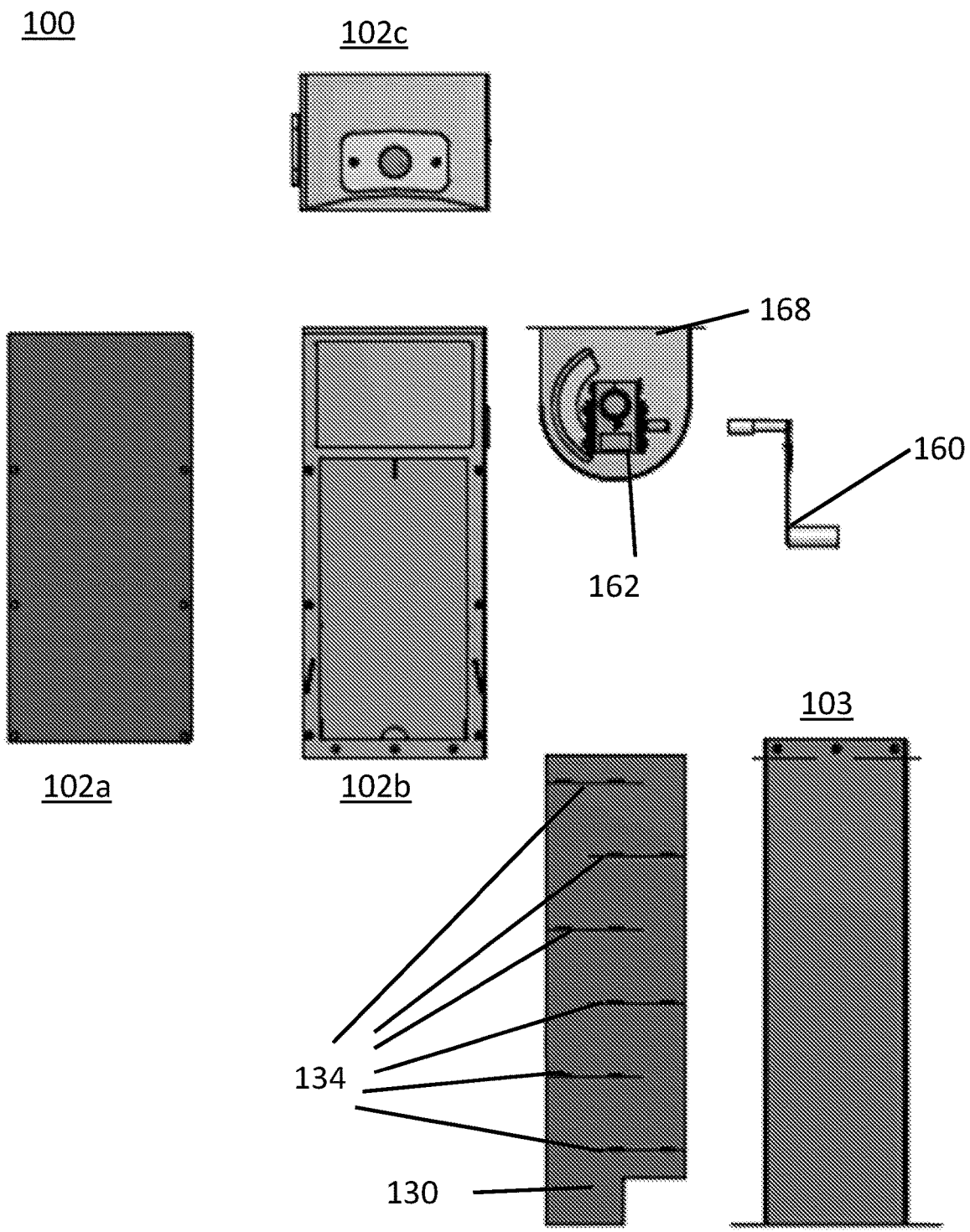
FIG. 10 is an exploded front view of components for the air cooler of FIG. 1.

FIG. 10 is an exploded view showing the various components that are assembled together to obtain the air cooler 100. The upper portion of the housing 102 is shown as three pieces: a main body 102a, a front panel 102b and a top cap 102c. The manually operated fan 168 and gear box 162 are shown as a single piece, with the hand crank 160 as a separate piece. The insert 130 with baffles is made as a separate piece, and is then inserted into the lower portion 103 of the housing. The fan 168 and gear box 162 are attached to the top cap 102c, which is then attached to the main body 102a. the hand crank 160 passes through one side of the main body 102, and is then attached to the gear box 162. The front panel 102a is attached to the main body 102b, which is then attached to the lower portion 103. The front panel may include informational graphics, such as for example instructions on operating the air cooler.

The air cooler may be shipped as two separate components corresponding to the upper portion 102 and the lower portion 103.

It is contemplated that the lower portion/footer will first inserted into a hole in the ground. The upper portion and the lower portion are then joined together. Referring back to FIG. 7, the upper portion usually has larger length and width dimensions than the lower portion. The exterior surface of the upper end of the lower portion may include tabs (not visible) on both sides and the front. A front shim (not visible) and side shims 190 are placed upon the tabs, and are intended to fill any space/gap between the upper portion and the lower portion. It is noted that the side shims include a trench which engages the divider 180. Referring now to FIG. 7 and FIG. 10 together, the front panel 102b can be removed from the main body 102a to permit access to the interior, and bolts are used to join the main body and the footer together along their front and rear faces. The front panel can then be placed back onto the main body. The hole is then backfilled and the soil compacted tightly around the entire unit.

Figure 11:
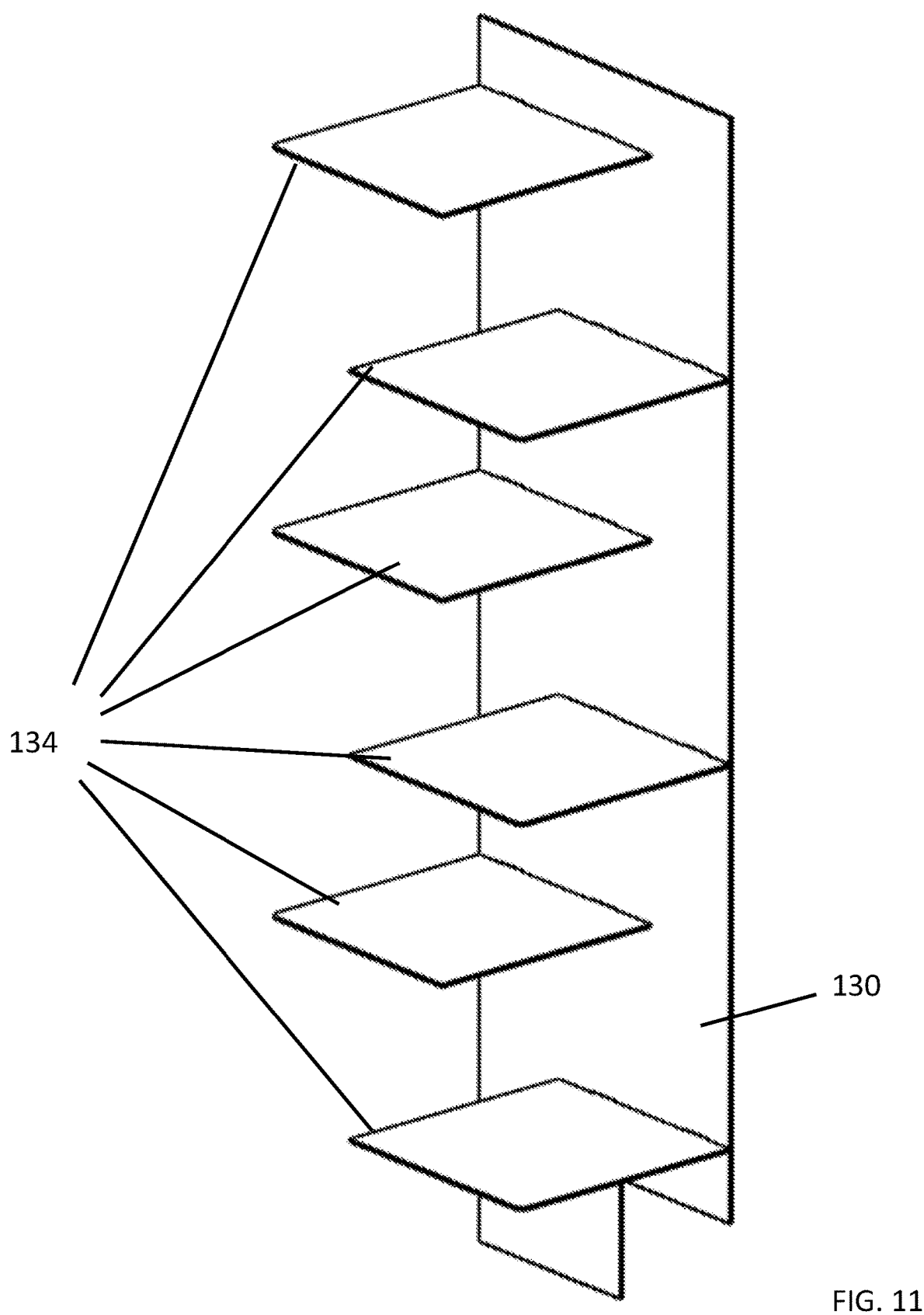
FIG. 11 is a perspective view of an insert with baffles on only the front side of the insert, which can be used in the air cooler of FIG. 1.
Figure 12:
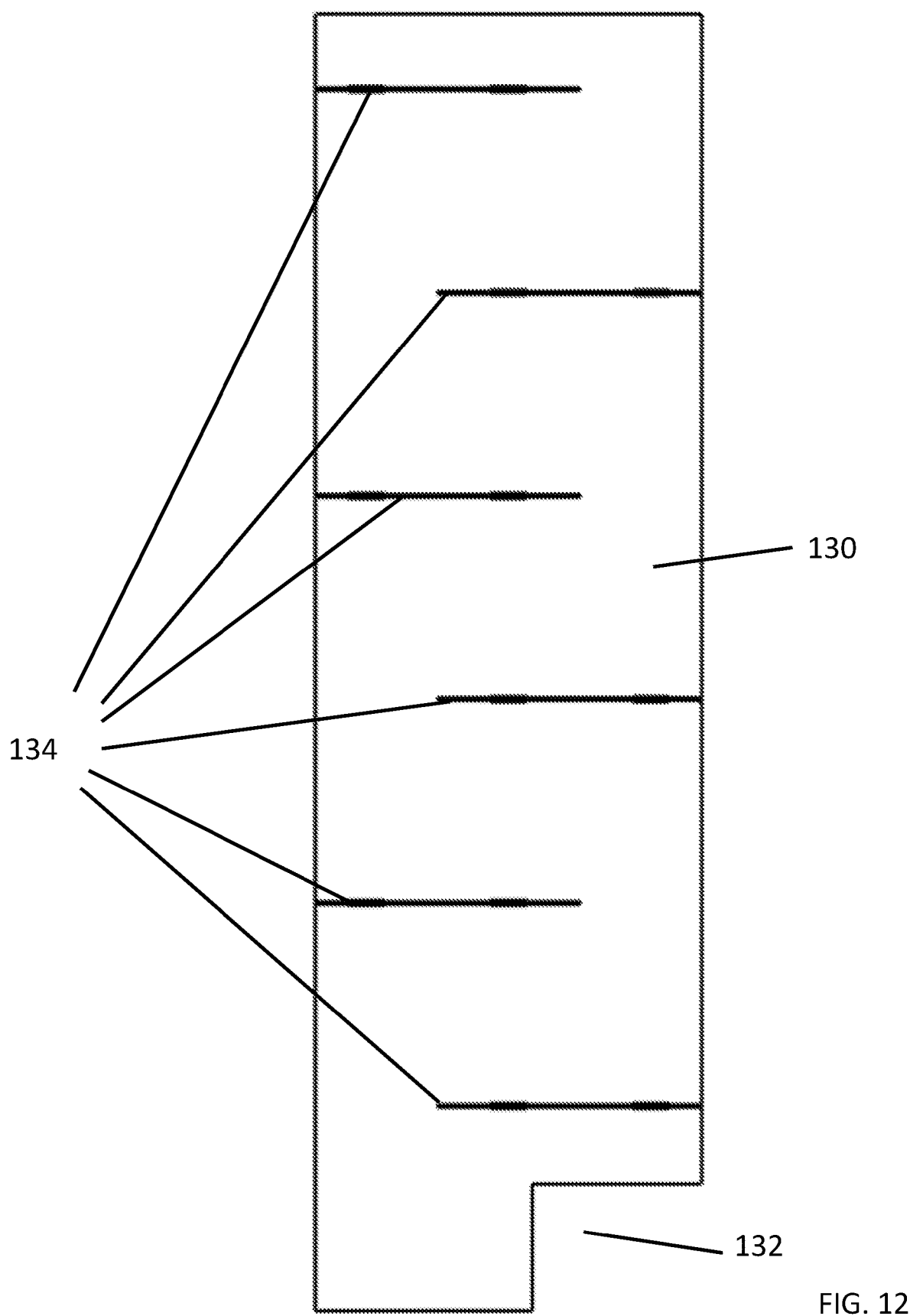
FIG. 12 is a front view of the insert with baffles of FIG. 12.

FIG. 11 is a perspective view of the insert 130 with baffles 134 attached, and FIG. 12 is a front view. Before the insert is placed in the lower portion of the housing, baffles are secured to the insert. For example, the insert may be made with slits that engage slits present on each baffle. Alternatively, the baffles can be attached or welded to the insert. A cutout 132 is present at the bottom of the insert to allow air flow from the front side of the insert to the rear side of the insert. The insert is intended to be inserted into the lower portion of the housing.

Referring now to FIG. 12, it can be seen that the baffles are placed in an alternating pattern between the two sides traveling downwards. This pattern causes the air to travel laterally as it travels downward. The last baffle is placed above the cutout to maximize the length of the air passage and the residence time of the air.

Figure 13:
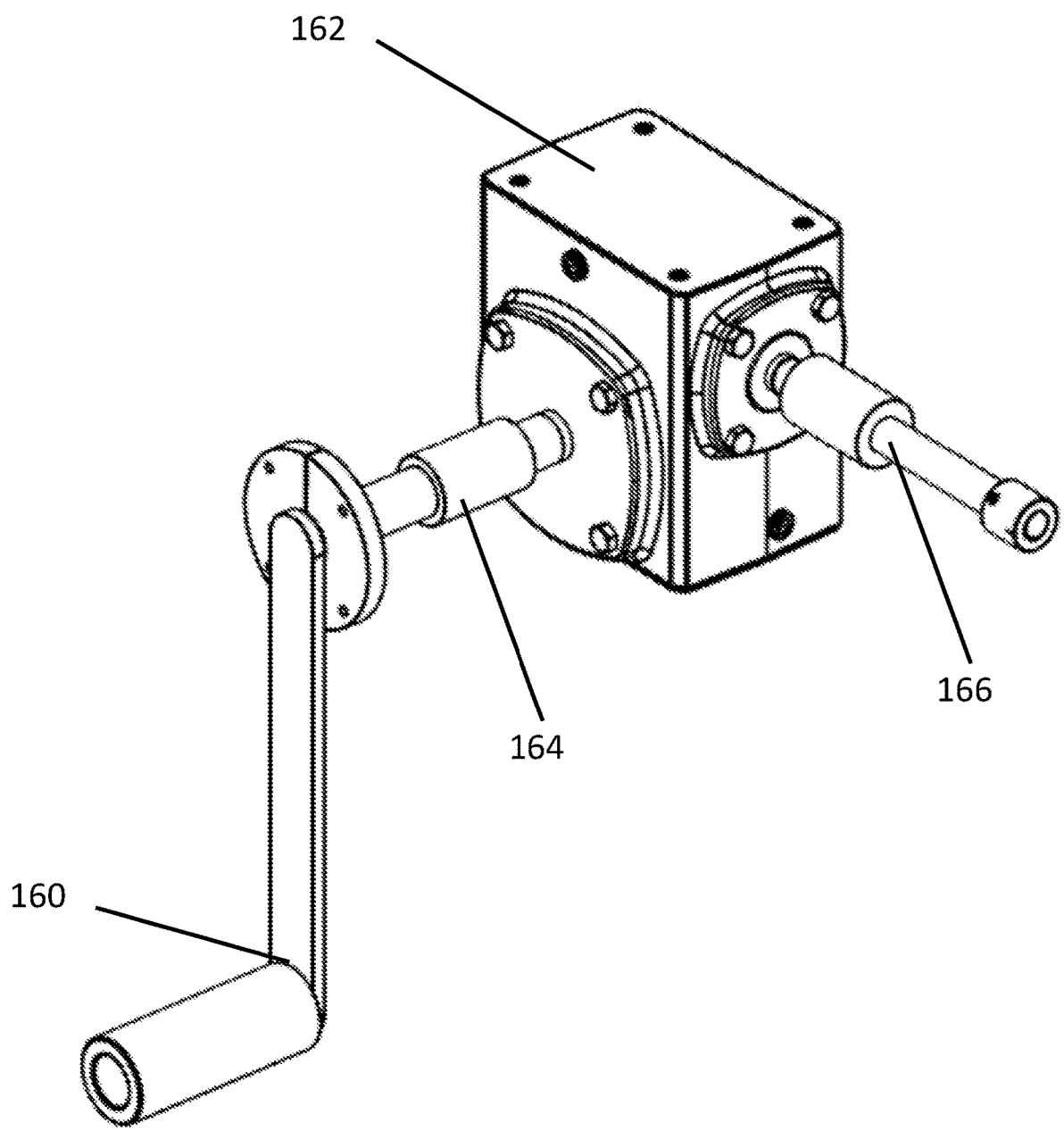
FIG. 13 is a rear perspective view of a hand crank and a gearbox used in the air cooler of FIG. 1.

FIG. 13 is a rear perspective view of the hand crank 160 and the gearbox 162. The hand crank attaches to a gearbox input shaft 164, and the gearbox output shaft 166 is perpendicular to the gearbox input shaft. The gear box output shaft connects to the manually operated fan, allowing the hand crank to operate the manually operated fan.

Figure 14:
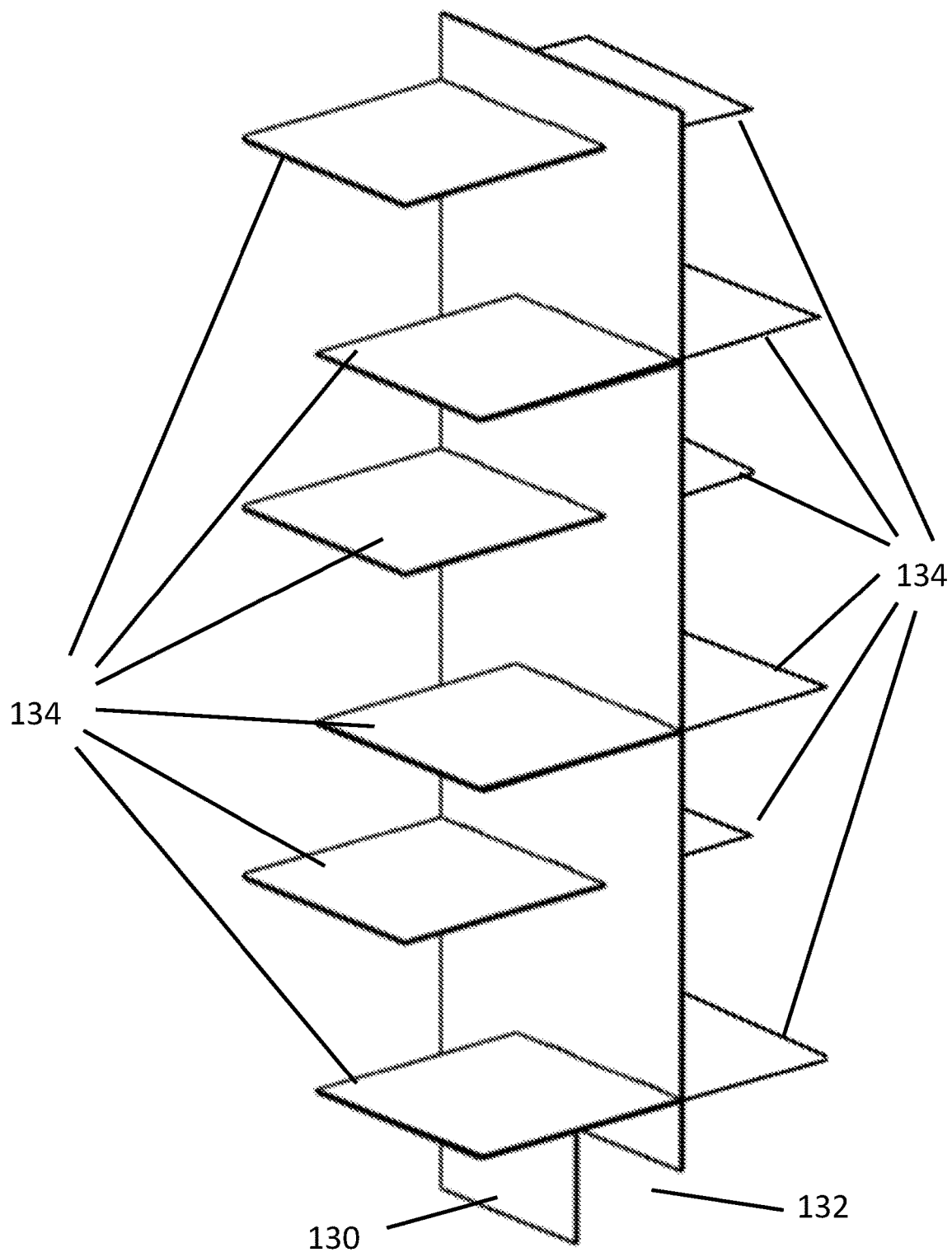
FIG. 14 is a perspective view of a second embodiment of an insert that can be used in the lower portion of the air condition, which includes baffles on both the front side and the rear side of the insert.

Some variations are contemplated as being within the scope of the present disclosure. For example, the insert of FIG. 11 only has baffles 134 on one side of the insert 130. In one variation, FIG. 14 is a front perspective view of an embodiment of the insert 130 which has baffles 134 on both the front side and the rear side. In this embodiment, the air passage is made even longer as the baffles cause the air to move laterally on both sides of the insert as the air travels both downwards and upwards.

Figure 15:
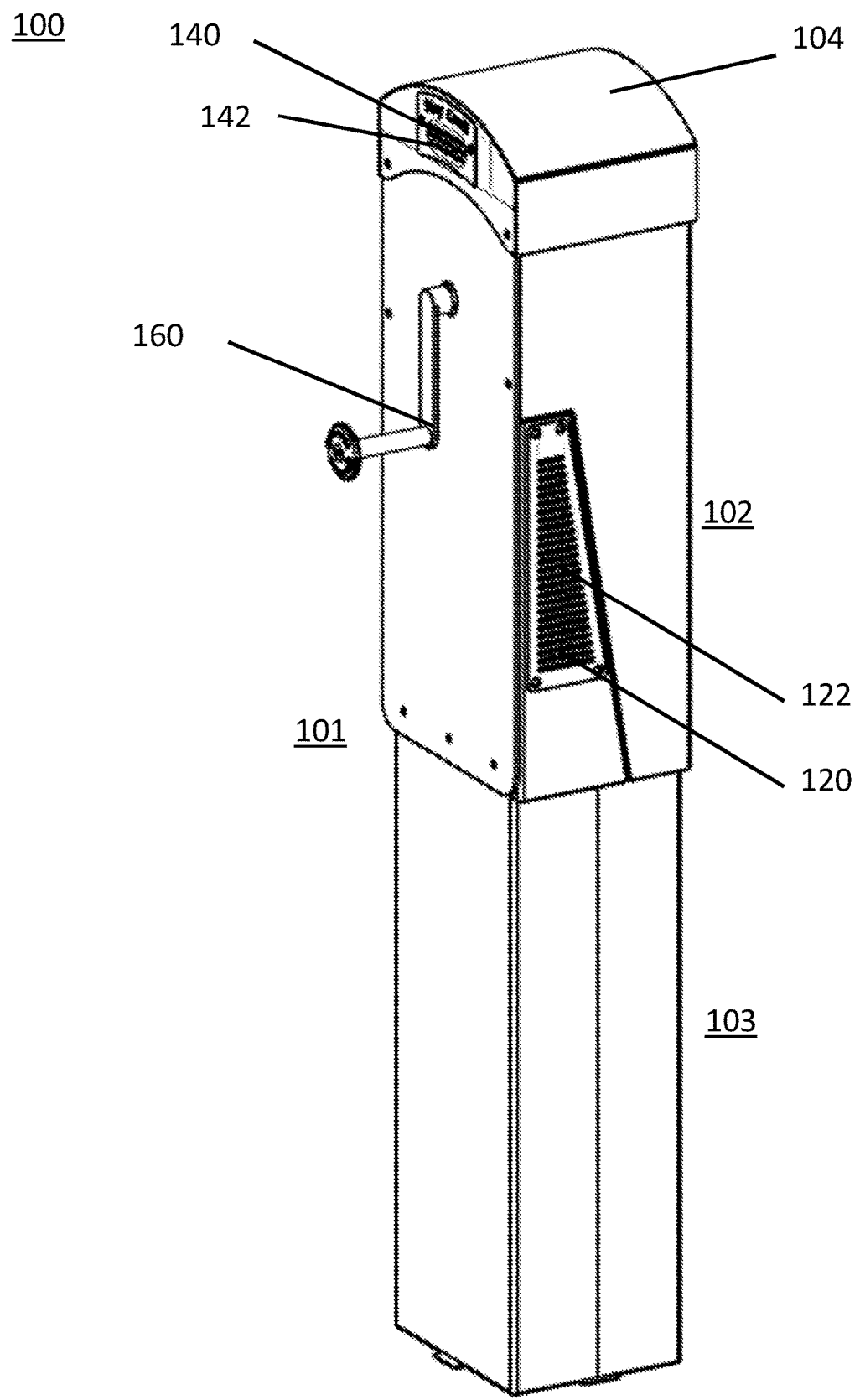
FIG. 15 is an exterior front perspective view of a second embodiment of an air cooler of the present disclosure.
Figure 16:
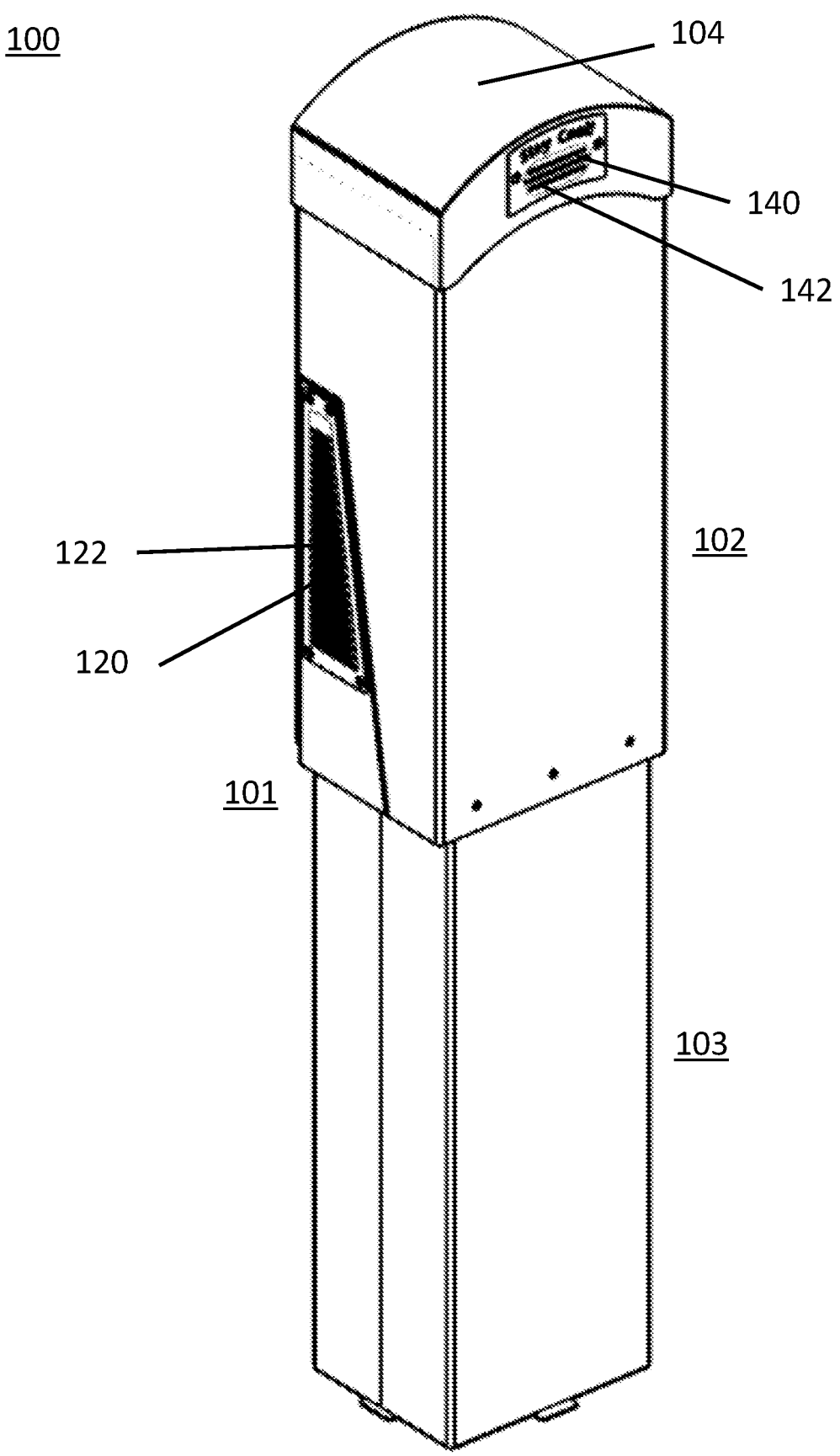
FIG. 16 is an external rear perspective view of the air cooler of FIG. 15.
Figure 17:
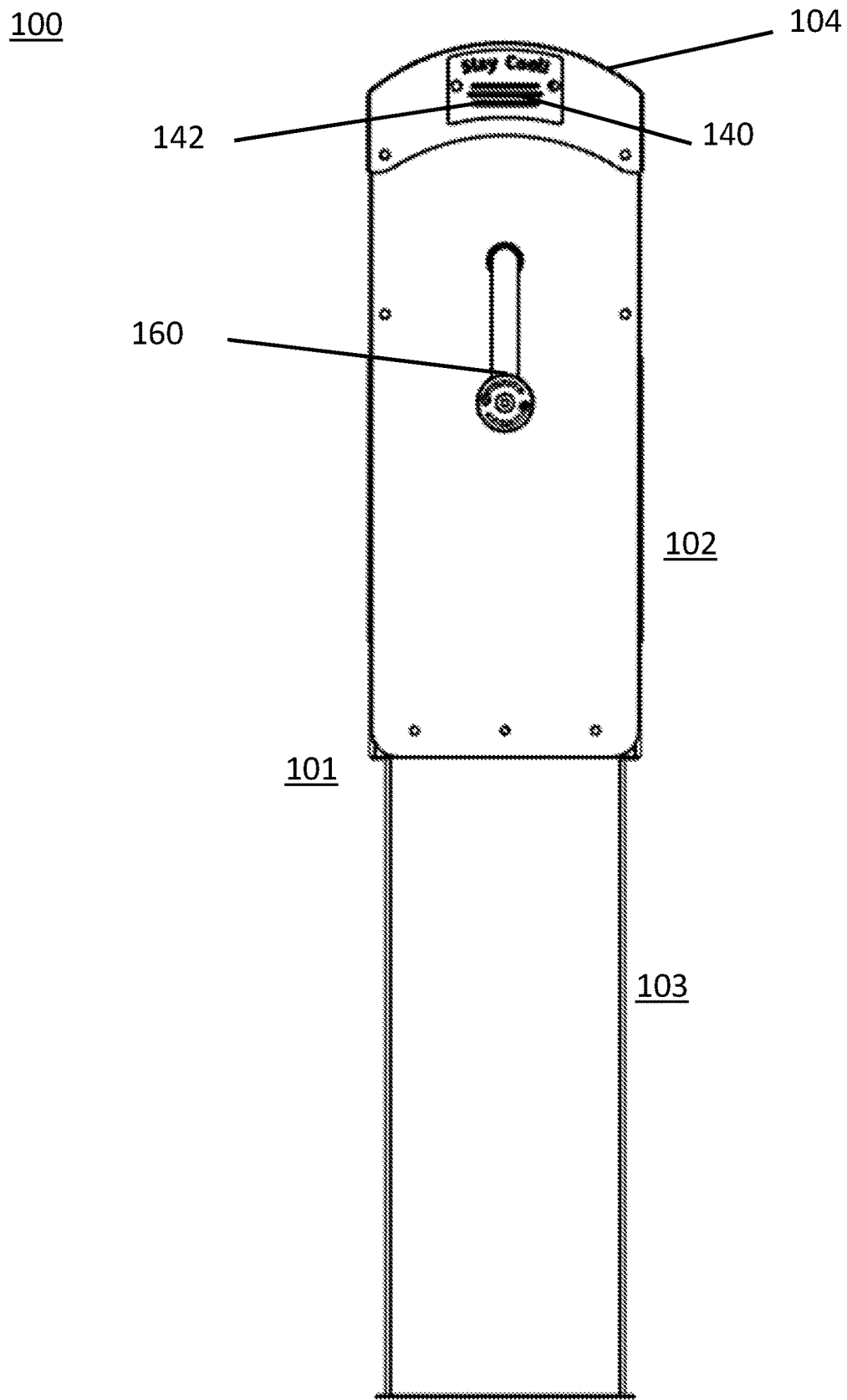
FIG. 17 is a front view of the air cooler of FIG. 16.
Figure 18:
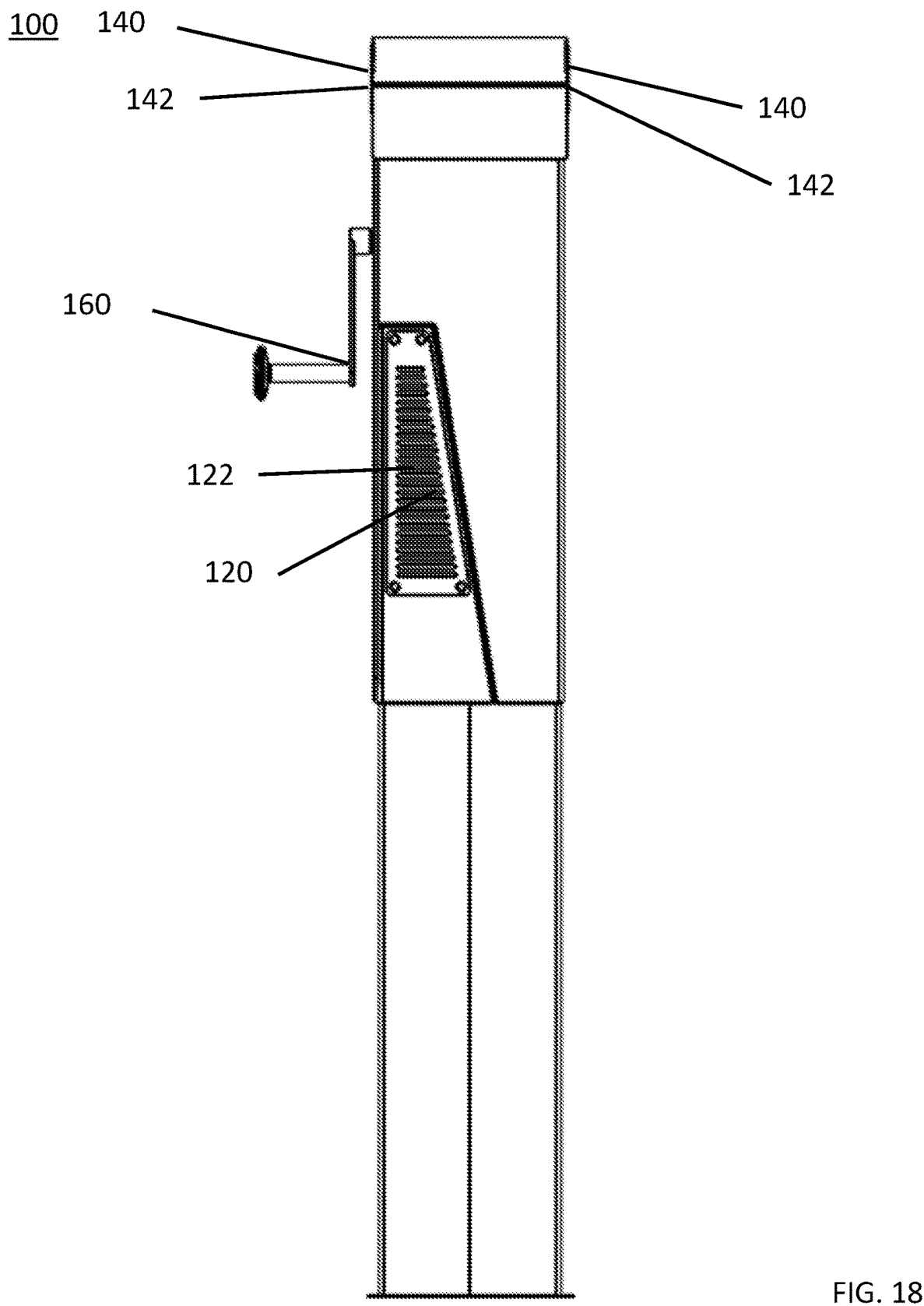
FIG. 18 is a first side view of the air cooler of FIG. 16.
Figure 19:
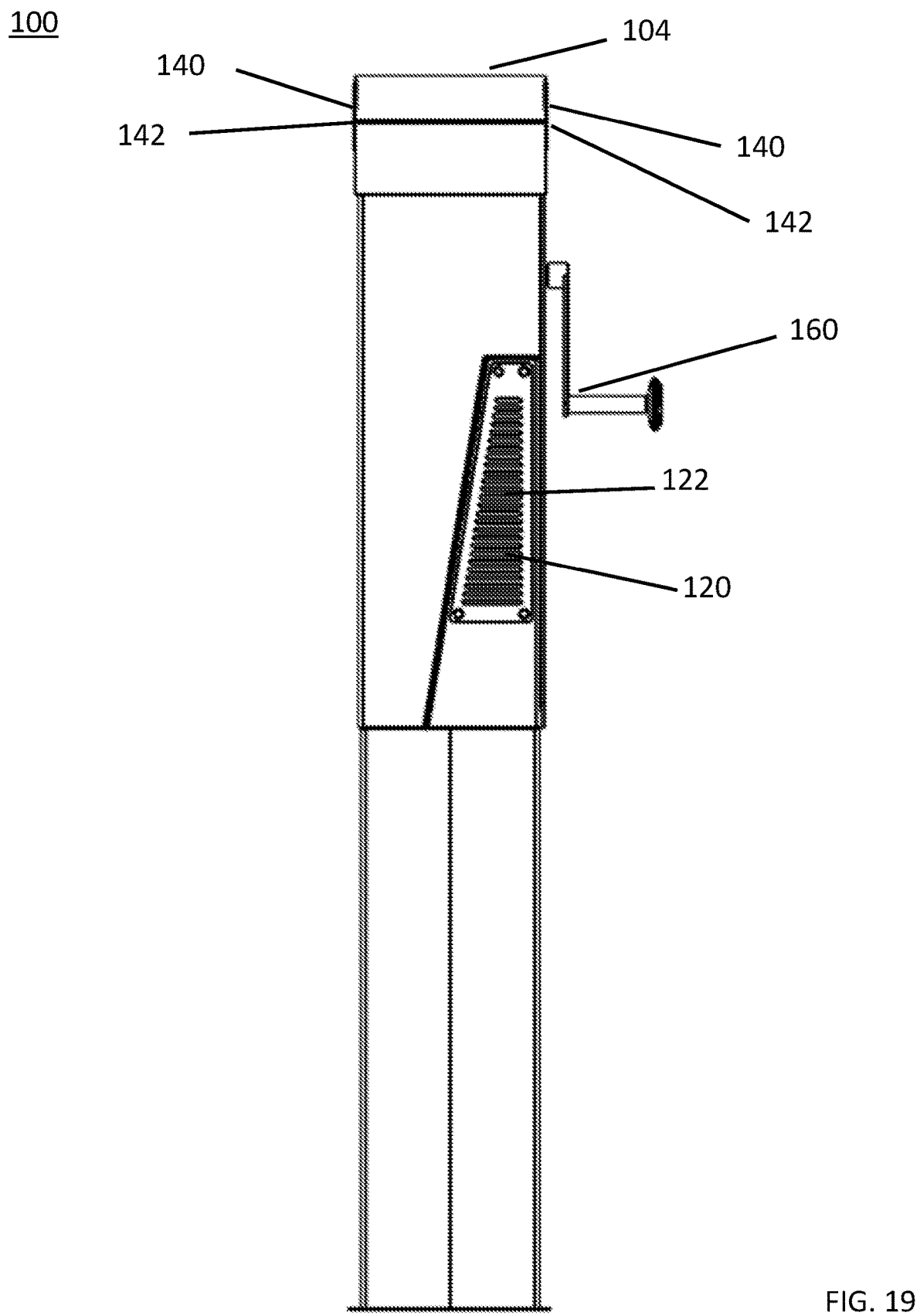
FIG. 19 is a second side view of the air cooler of FIG. 16.
Figure 20:
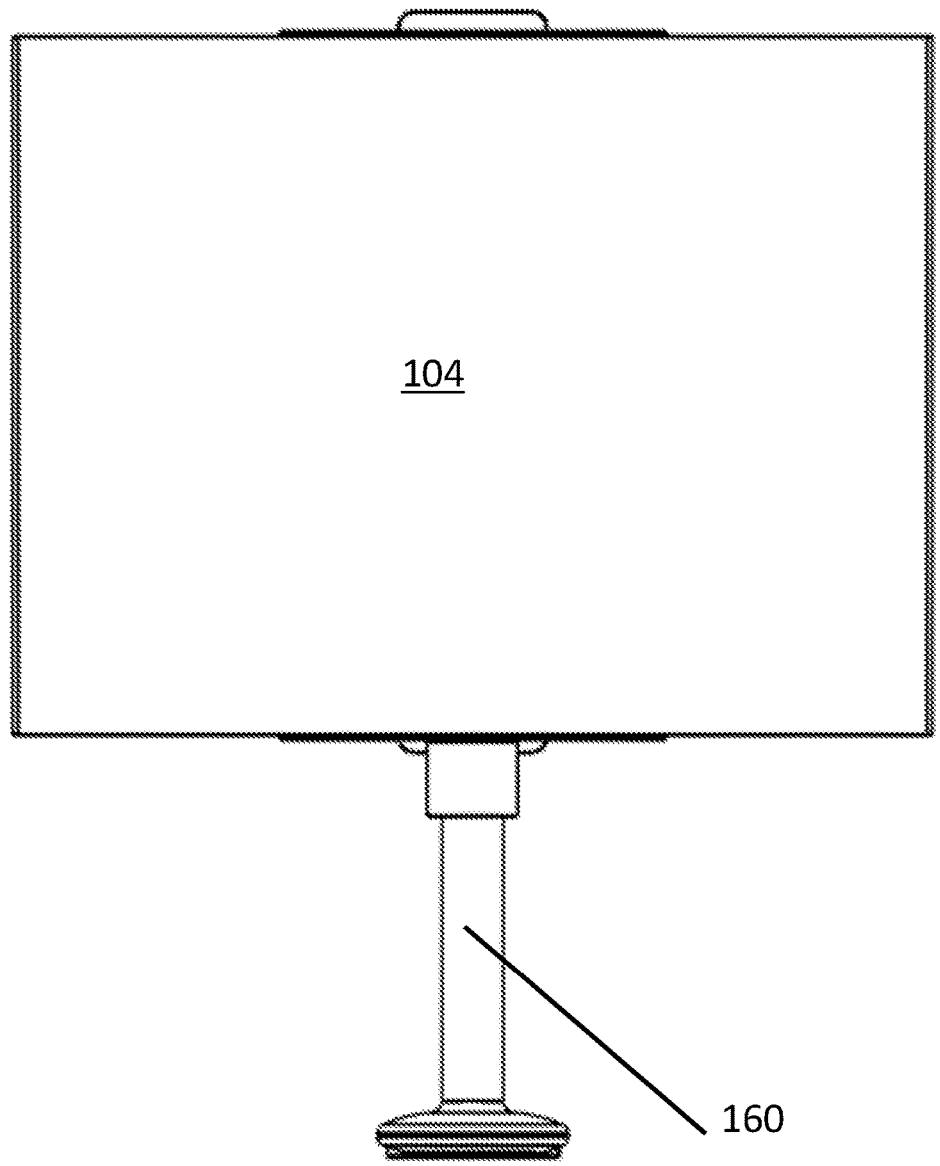
FIG. 20 is a top view of the air cooler of FIG. 16.

FIGS. 15-20 illustrate a second embodiment of an air cooler 100. FIG. 15 is an exterior front perspective view. FIG. 16 is an exterior rear perspective view. FIG. 17 is a front view. FIG. 18 is a first or right side view. FIG. 19 is a second or left side view. FIG. is a top view.

This embodiment is very similar to that of FIGS. 1-6, except that the locations of some components have moved. Here, the hand crank 160 is present on the front side 108 of the housing 101. The inlet slots 122 are still on opposite sides 106, 107 of the housing. The outlet vents 142 are present on the front side 108 and the rear side 109 of the housing. In this embodiment, and referring back to FIG. 13, the gearbox output shaft 166 would be parallel to the gearbox input shaft 164, rather than perpendicular.

Figure 21:
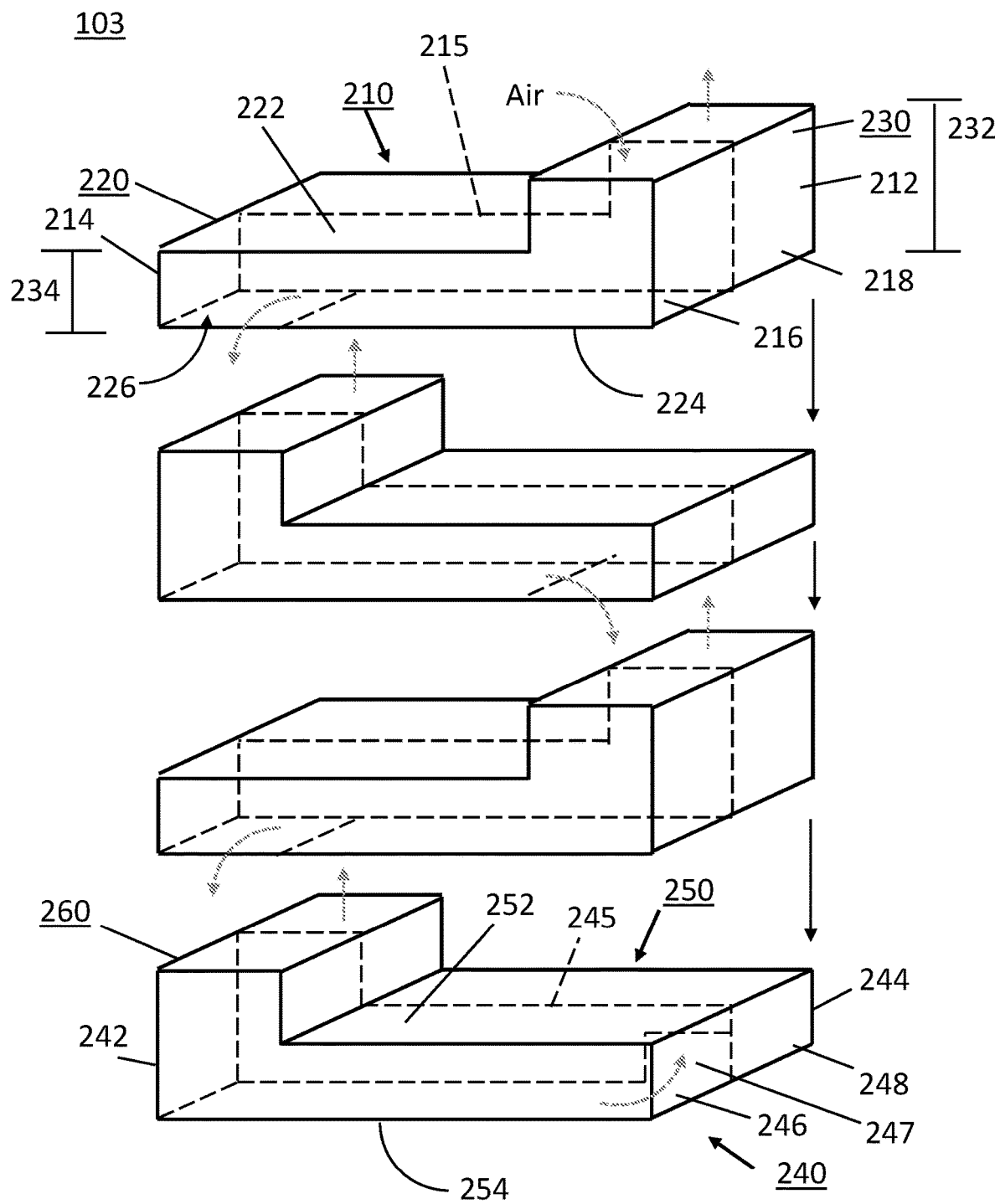

FIG. 21 is another variation on the lower portion 103 of the housing. Here, the lower portion of the housing is formed from a plurality of intermediate L-shaped boxes 210 and a terminal L-shaped box 240. In FIG. 21, three intermediate boxes are shown.

Each intermediate L-shaped box 210 can be described as the combination of a lower rectangular block 220 with an upper stem 230. The box has a first end 212 and a second end 214 opposite the first end. The upper stem 230 is present at the first end 212 of the block, and extends from the upper surface 222 of the lower block. A divider 215 divides the interior volume of the box into a first portion 216 and a second portion 218. The divider is indicated here in dashed line. Openings 226 are present in the lower surface 224 of the box at the second end, in both the first portion and the second portion. The interior volume of the box is open. The upper stem 230 is open, or in other words, air can flow in and out of both the first portion and the second portion.

The height of the box at the first end (including the upper stem) is indicated with reference numeral 232. The height of the box at the second end is indicated with reference numeral 234. As can be seen here, the height of the box is greater at the first end compared to the second end.

The terminal L-shaped box 240 is of similar structure, having a lower rectangular block 250 with an upper stem 260. The box has a first end 242 and a second end 244 opposite the first end. The upper stem 260 is present at the first end 242 of the block, and extends from the upper surface 252 of the lower block. The upper stem is open, or in other words, air can flow in and out. A divider 245 divides the interior volume of the box into a front portion 246 and a rear portion 248. The divider is indicated here in dashed line. The interior volume of the box is open. The upper stem 260 is open, or in other words, air can flow in and out of both the front portion and the rear portion. However, the terminal L-shaped box does not have openings in the lower surface 254 of the box at the second end. Instead, the lower surface is solid. In addition, the divider 245 includes a cutout 247 at the second end.

Taken together, the combination of the intermediate L-shaped boxes 210 and the terminal L-shaped box 240 form a lower portion of the housing with an air passage 210 that travels both laterally and vertically. Arrows in FIG. 21 show the flow of air through the structure, down through both the upper stem and the lower block of each L-shaped box, and back up as well. As can be seen here, adjacent intermediate L-shaped boxes are rotated 180° with respect to each other. Thus, the openings 226 in the lower surface of one box engage the open upper stem 230 of another box. Depending on the orientation of the intermediate L-shaped box, a given first portion 216 may correspond to either a front portion or a rear portion of the air passage. Referring to FIG. 7, the divider 180 in the upper portion of the housing can be shaped appropriately to direct air flow into the upper stem of the uppermost intermediate L-shaped box.

When burying the lower portion 103 of FIG. 21 underground, a large hole is first dug. The terminal L-shaped box 240 is then placed at the bottom of the hole. Dirt or earth is then applied upon the upper surface 252 until reaching the level of the upper stem 260. Then, an intermediate L-shaped box 210 is affixed to the upper stem 260, with the openings 226 aligned to the upper stem 260. More dirt/earth is then applied to the upper surface 222 until reaching the level of the upper stem 230. This is repeated until all intermediate L-shaped boxes are buried. The upper portion 102 of the housing is then attached to the uppermost intermediate L-shaped box. Of note, this variation on the lower portion of the housing has increased surface area contact with the earth, which increases the amount and/or rate of cooling that can be performed.

Other variations are also contemplated. Inlet slots 122 and outlet vents 142 may be present on any combination of the four sides of the housing. Although the housing 101 is depicted as having a rectangular shape, other shapes may be used as well, such as cylindrical/circular, triangular, hexagonal, etc. As another variation, the upper portion 102 and the lower portion 103 may be of different shapes. For example, the upper portion could be cylindrical/circular, triangular, or hexagonal, while the lower portion is rectangular.

The various components of the air cooler are made using appropriate materials and processes, such as metals, plastics, etc. In particular, the lower portion of the housing is made using a thermally conductive material to transfer heat out of the air and into the earth, such as steel.

The air cooler is used by turning the hand crank to operate the fan. The fan generates motion that sucks air from the air intake through the underground air passage and pushes air out of the air output. Air can blow out multiple outlet vents, cooling both the handle operator and one or more friends.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. An air cooler, comprising:
    a housing having an upper portion and a lower portion;
    wherein the upper portion contains an air intake, an air output, and a manually operated fan; and
    wherein the lower portion contains an air passage leading from the air intake to the air output, the air passage being shaped to cause the air to travel laterally and vertically.

2. The air cooler of claim 1, wherein the upper portion of the housing contains a divider that separates the upper portion of the housing into a front portion and a rear portion.

3. The air cooler of claim 1, wherein the air intake comprises a plurality of inlets on different sides of the upper portion of the housing.

4. The air cooler of claim 1, wherein a top wall of the upper portion of the housing includes a curved exterior surface.

5. The air cooler of claim 1, wherein air is directed from the manually-operated fan to the air output by at least one hose.

6. The air cooler of claim 1, wherein a base of the lower portion of the housing extends past the sides of the lower portion of the housing.

7. The air cooler of claim 1, wherein a front wall of the upper portion of the housing includes the air output and a hand crank for powering the manually-operated fan; and wherein the air intake comprises inlet slots located on opposite side walls of the upper portion of the housing.

8. The air cooler of claim 1, wherein a hand crank for powering the manually-operated fan is present on a first side of the upper portion of the housing; wherein the air intake comprises inlet slots located on the first side and a second side of the upper portion of the housing; and wherein the air output comprises outlet vents located on a front wall and the second side of the upper portion of the housing.

9. The air cooler of claim 1, wherein the lower portion of the housing is formed from a terminal L-shaped box and a plurality of intermediate L-shaped boxes,
    wherein each intermediate L-shaped box includes an open upper stem at a first end, a divider dividing an interior volume in half, and openings at a second end in a lower surface; and
    wherein the terminal L-shaped box includes an open upper stem at a first end, a divider dividing an interior volume in half, and a cutout in the divider at a second end of the box.

10. The air cooler of claim 1, wherein the lower portion of the housing is adapted to be buried underground to improve stability.

11. The air cooler of claim 1, wherein the air output has more than one outlet.

12. The air cooler of claim 11, wherein the outlets are on different sides of the upper portion of the housing.

13. The air cooler of claim 1, wherein the manually-operated fan is powered by a hand crank.

14. The air cooler of claim 13, wherein the hand crank is connected to the manually-operated fan through a gear box containing a gear train.

15. The air cooler of claim 1, wherein the lower portion of the housing contains an insert with baffles that cause the air to travel laterally, the insert dividing the air passage into a front portion and a rear portion, the insert including a cutout for air to pass from the front portion of the air passage to the rear portion of the air passage.

16. The air cooler of claim 15, wherein the baffles are in the front portion of the air passage and the rear portion of the air passage.

17. The air cooler of claim 15, wherein the baffles are in only the front portion of the air passage.

18. A method of using an air cooler, the method comprising the steps of:
providing an air cooler, the air cooler comprising a housing having an upper portion and a lower portion; the upper portion comprising an air intake, and air output, and a manually operated fan powered by a hand crank; the lower portion comprising an air passage leading from the air intake to the air output, the air passage being shaped to cause the air to travel laterally and vertically, wherein the lower portion is underground; and
turning the hand crank to operate the fan;
wherein the fan moves air from the air intake through the air passage and out of the air output.

19. The method of claim 18, wherein the lower portion of the housing contains an insert with baffles that cause the air to travel laterally, the insert dividing the air passage into a front portion and a rear portion, the insert including a cutout for air to pass from the front portion of the air passage to the rear portion of the air passage.

20. A method of installing an air cooler, comprising:
receiving the air cooler of claim 1;
burying the lower portion of the air cooler underground; and
joining the upper portion and the lower portion together.

* * * * *